Dec. 28, 1965  A. H. REUTHER  3,226,152
FLUID-ACTUATED VISOR SYSTEMS
Filed July 31, 1963  3 Sheets-Sheet 1

INVENTOR.
Albert H. Reuther

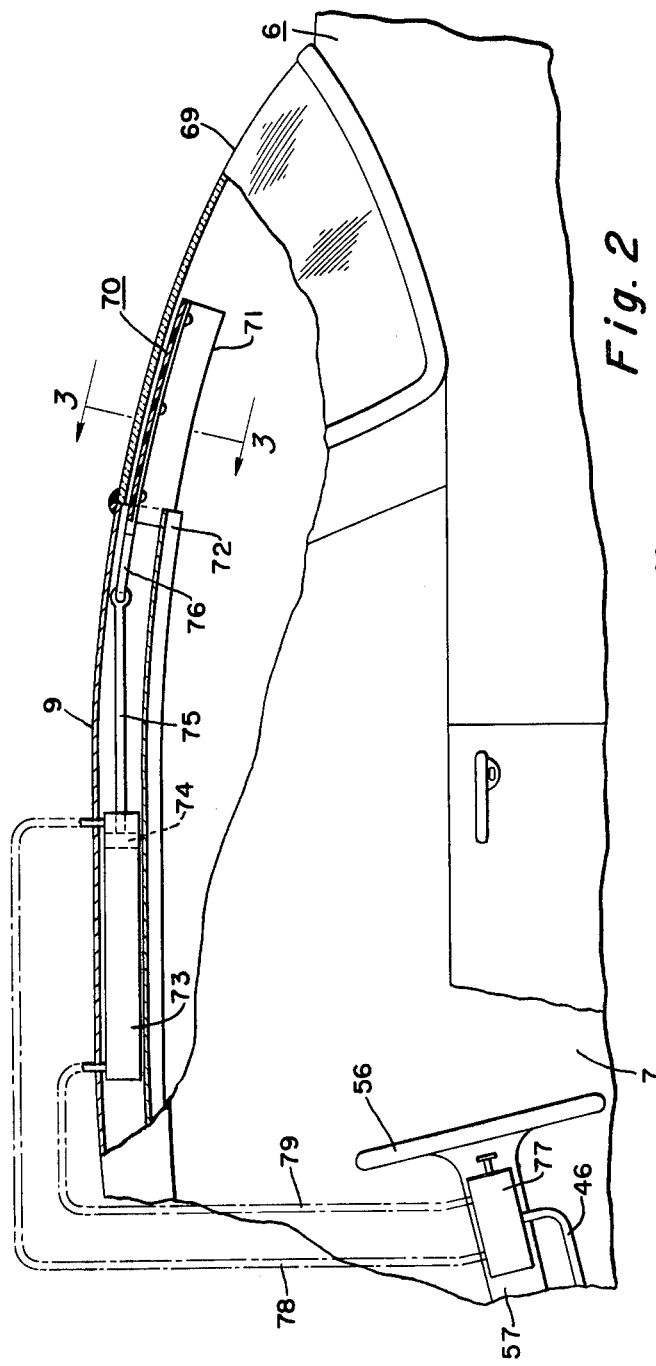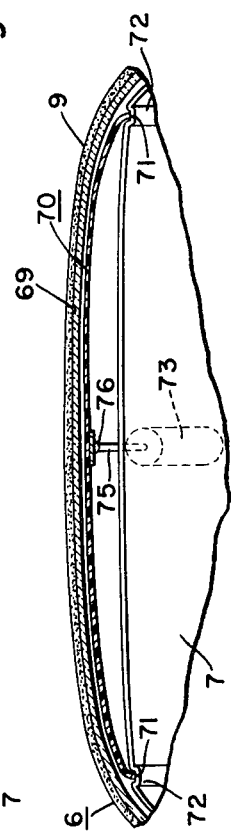

Dec. 28, 1965  A. H. REUTHER  3,226,152
FLUID-ACTUATED VISOR SYSTEMS
Filed July 31, 1963  3 Sheets-Sheet 3
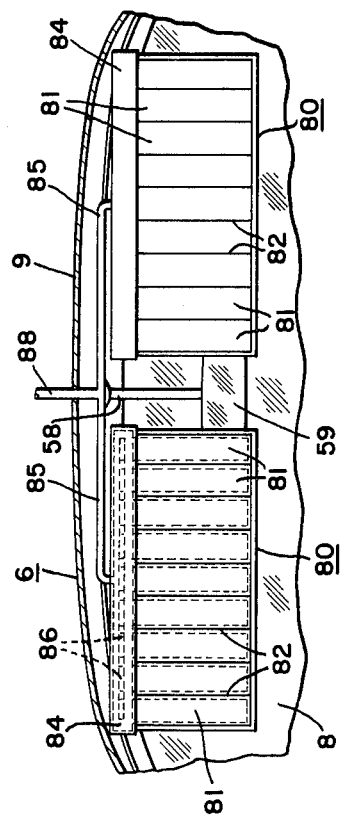
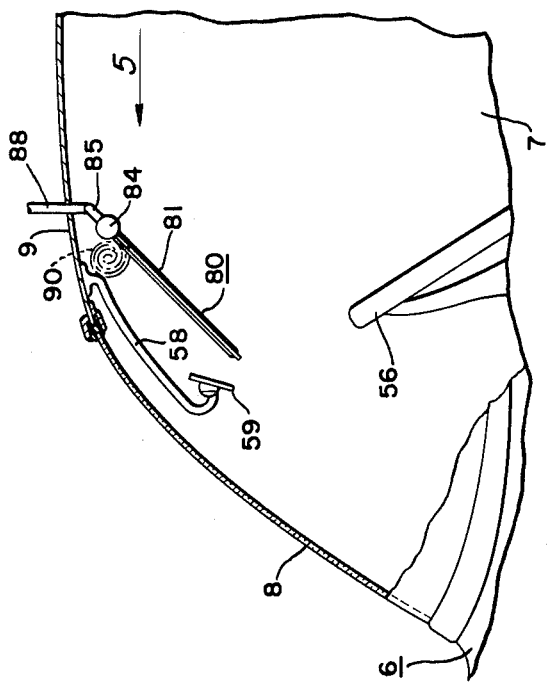
INVENTOR.
Albert H. Reuther United States Patent Office 3,226,152
Patented Dec. 28, 1965

3,226,152
FLUID-ACTUATED VISOR SYSTEMS
Albert H. Reuther, Dayton, Ohio, assignor to General Motors Corporation, Detroit, Mich., a corporation of Delaware
Filed July 31, 1963, Ser. No. 299,045
19 Claims. (Cl. 296—97)

This invention relates to sun-glare visor actuation and, more particularly, to fluid-actuated sunvisor systems for use on vehicles such as bus, truck and car bodies as well as air frames.

An object of this invention is to provide a new and improved mobile visor means powered in combination with a vehicle pressurized-fluid source for safety and convenience during travel subject to changes in conditions of glare due to sunlight and other causes of faulty vision for a vehicle driver and/or passengers.

Another object of this invention is to provide in combination a vehicle ride-height suspension system having compressor-reservoir means as a source of fluid medium under pressure for controlled actuation of vehicle fluid spring means as well as for controlled actuation of a movable sunvisor means subject to change of positioning for sun-glare shielding of an individual.

Another object of this invention is to provide, in combination on a vehicle, a pressurized fluid source, a passenger-accessible valve-like control means subject to multi-position setting for passage of actuating fluid flow from the source by conduit means, and a movable sunvisor means shiftable such as by an articulated linkage, rack and pinion, track-like support and other suitable guide-control means due to supply of pressurized actuating fluid to a piston-cylinder means carried by the vehicle near the movable sunvisor means and connected to the conduit means for fluid power supply thereto.

A further object of this invention is to provide a vehicle having a combined source of pressurized fluid used to actuate both a vehicle ride-height suspension system for support and shock absorption between sprung and unsprung masses as well as a fluid actuated sun-visor system having a vehicle body supported fluid actuator for variable remote to and fro positioning of the visor means along inner sides of glass or transparent viewing locations where passengers may be subjected to bothersome glare and bright light which can be blocked by remote-controlled and selective visor positioning.

Another object of this invention is to provide, in combination on a vehicle, a pressurized fluid source, a passenger-accessible multi-position control means suitably mounted within reach in a passenger compartment and having conduit means therewith to control supply and relief of pressurized fluid from a manifold means having plural passages along a longitudinal support portion from which a roll-up tongue-like visor means is inflatable and deflatable as to a bag-like compartmenting thereof with a predetermined thickness and length to serve as a glare shield and to be spirally retractable into a compacted location adjacent to vehicle window means.

Further objects and advantages of the present invention will be apparent from the following description, reference being had to the accompanying drawings wherein preferred embodiments of the present invention are clearly shown.

In the drawings:

FIGURE 2 is a partially sectioned view of a modified control means and fluid-actuated visor system for use in the combination of FIGURE 1.

FIGURE 3 is a cross-sectional view taken along line 3—3 in FIGURE 2.

FIGURE 4 is a partially sectioned view of another embodiment of a fluid-actuated visor system in accordance with the present invention.

FIGURE 5 is a view taken in the direction of arrow 5 in FIGURE 4.

Figure 1:
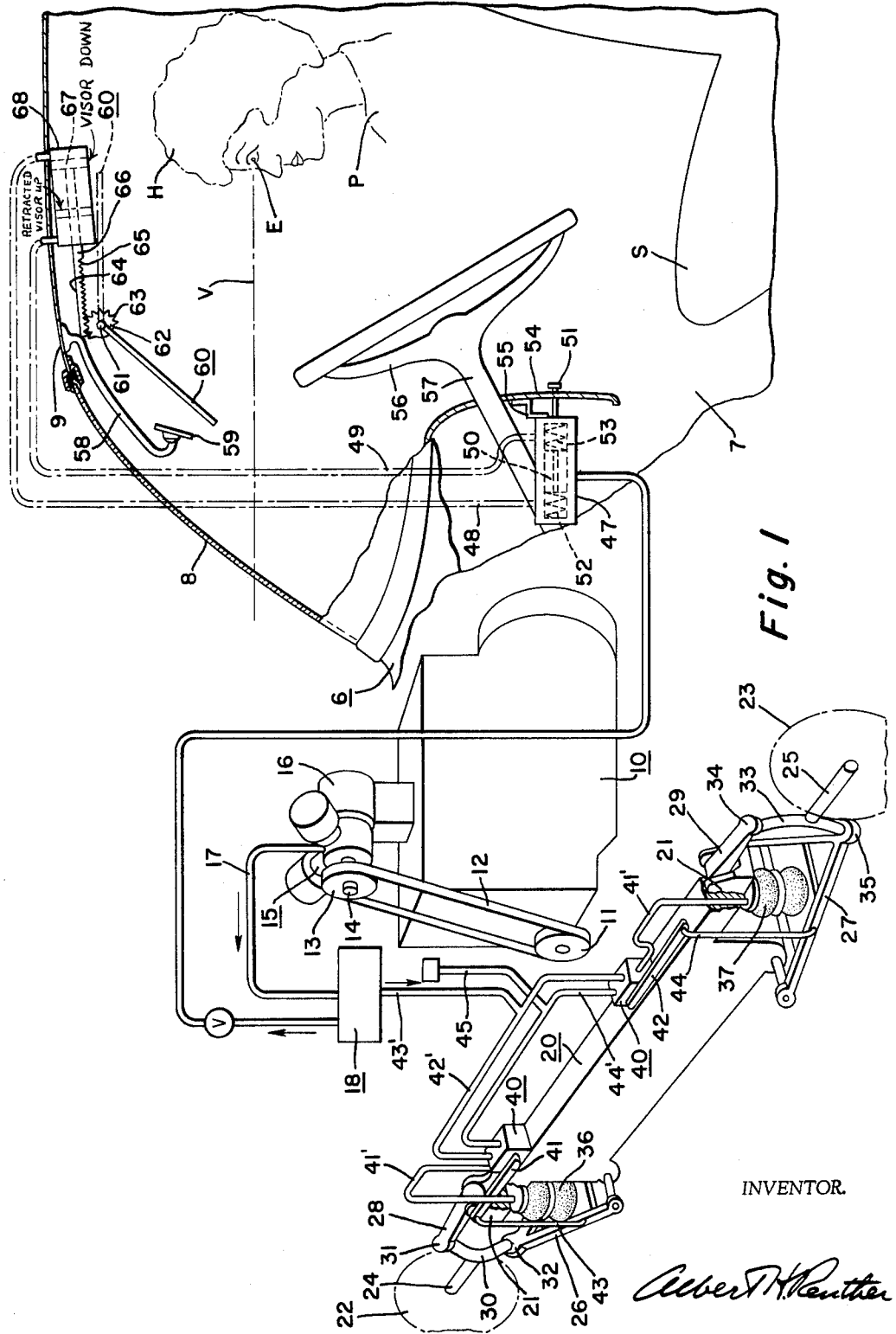
FIGURE 1 is a fragmentary perspective and diagrammatic illustration of a vehicle having a combination ride-height suspension system with a pressurized fluid source and fluid-actuated visor system.

In FIGURE 1 there is illustrated a vehicle, generally indicated by numeral 6, having a passenger compartment 7 including a seat S to be occupied by a passenger P such that head H and eyes E have a predetermined range of vision V through a transparent windshield 8 of glass or other suitable material. The windshield is suitably assembled to the vehicle body 6 such that a roof portion 9 of the vehicle body has a juncture with an upper edging of the windshield 8 in a location well above the head of the passenger. Thus the transparent material of the windshield 8 can permit passage of direct rays of bright light such as from the sun or even from headlights of other vehicles which can impair vision and which can be disturbing during vehicle use.

The vehicle 6 also includes an engine or motor, generally indicated by numeral 10, having a rotatable shaft which drives a pulley 11 and belt 12 that engages another pulley 13 attached to a crankshaft extension 14 of an air compressor means generally indicated by numeral 15. This air or fluid compressor means 15 can be suitably mounted relative to the motor or engine 10. Lubrication for the fluid or air compressor means 15 can be self-contained or can be supplied optionally from the lubricating system of engine 10 or from a power steering fluid pump means 16 having additional power steering fluid components connected thereto though not shown.

Thus the vehicle engine 10 causes rotation of a compressor crankshaft by way of the pulley 11, belt 12, and pulley 13 thereby effecting compression of air supplied through a conduit 17 to a high pressure air storage tank or source identified generally by numeral 18 in FIGURE 1. This pressurized pneumatic source 18 is utilized in combination with a vehicle ride-height suspension system as well as a fluid-actuated visor system on the vehicle 6. The vehicle includes a sprung mass or chassis frame, generally indicated by numeral 20, which can extend transversely of the vehicle body and having opposite ends 21 thereof located adjacent to wheels 22 and 23. These wheels 22 and 23 are suitably journaled for rotation relative to front wheel axle assemblies or unsprung masses 24 and 25 respectively, each including lower control arms 26 and 27 as well as upper control arms 28 and 29 respectively, pivotally carried by the opposite ends 21 of the cross frame or sprung mass 20. The control arms 26 and 28 are interconnected by a steering knuckle means 30 journaled with the control arms by spherical joints 31 and 32. Similarly, the control arms 27 and 29 are interconnected by a steering knuckle means 33 journaled by spherical joints 34 and 35 in a well known manner. Fluid springs means 36 and 37 are provided between the lower control arms 26 and 27 and opposite ends 21 of the cross frame means 20 which is thus a sprung mass supported by the wheel assemblies by means of the fluid spring means 36 and 37. The fluid springs means 36 and 37 can be of a bellows type adapted to receive air under pressure to effect resilient suspension of the sprung mass 20 upon the wheel assemblies and to maintain a predetermined clearance height between the sprung mass of the vehicle frame-body and unsprung mass including the wheel assemblies both when the vehicle is stopped and to provide for correction of any change in height relation between the sprung and unsprung masses to re-established predetermined clearance height therebetween due to change in vehicle loading and/or vehicle movement over an irregular or uneven road surfacing.

Fluid pressure within the fluid spring means 36 and 37 is regulated by fluid control valve means, generally indicated by numeral 40, that can be suitably supported on the frame means 20. These control valve means 40 have actuating lever means 41 and 42 respectively, that are connected with the lower control arms 26 and 27 of the front wheel assemblies through actuating links 43 and 44. These levers and links move upwardly to open a fluid controlled valve means 40 to allow fluid under pressure to be admitted to the air spring means 36 and 37 whenever there is a change in load or vehicle height conditions resulting in a downward settling of the body or frame means as to the wheel assemblies. Conversely, upward movement of the frame or body relative to the front wheel assemblies causes a downward movement of the levers and links to open fluid exhaust valves within the control valve means 40 permitting exhaust of fluid from the air springs means 36 and 37. Such operation of the control valve means 40 effects a correction of clearance height between the sprung and unsprung masses of a vehicle to maintain clearance height relatively constant irrespective of load conditions. Further details of control valve means 40 as well as the compressor means 15 can be obtained by referring to a Patent 2,935,023—Jackson et al., issued May 3, 1960, on a Steering and Air Compressor Lubrication System belonging to the assignee of the present invention. The vehicle ride-height suspension means further includes fluid supply conduit connections 41' from the control valve means 40 to each of the air spring means 36 or 37 from the respective control valve. Fluid under pressure is supplied by the inlet connection 42' for the control valve means 40 from a conduit 43' connected thereto from the air reservoir source or high pressure storage tank means 18. Also the control valve means 40 have an exhaust fluid conduit connection 44' having a suitable juncture with an exhaust line 45 as shown in FIGURE 1.

Another fluid conduit connection 46 extends from the pressurized fluid source 18 to a passenger-accessible valve-like control means 47 also having conduit connections 48 and 49 therewith as illustrattd in FIGURE 1. This control means 47 can include a spool-like plunger 50 assembled to an actuator 51 thereof adapted to shift the plunger means 50 for interconnecting conduits 48 and 49 alternately with the pressure inlet conduit connection 46. The plunger means 50 can include centering springs means 52 and 53 for maintaining intermediate positioning thereof within the actuator control means 47. The plunger means 50 can also have lands and a peripheral metering arrangement as disclosed in a Patent 2,910,091—Weis, issued October 27, 1959, to the assignee of the present invention. The peripheral metering distributor valve of this Weis patent is cited as an example of the type of structure which can be used for the control actuator means 47. The plunger member of the Weis patent has a hollow configuration and hereby includes provision for alternately connecting a pair of conduit connections thereto such as 48 and 49 with the central hollow portion for alternate exhausting purposes. Sliding movement of the actuator or button means 51 can occur against bias of spring means 52 and 53 indicated in FIGURE 1 for centering of the plunger member 50. The actuator control means 47 having the shiftable button control 51 can be suitably secured to a vehicle dashboard means 54 by a support or bracket 55. A steering wheel means 56 including a steering 57 can be provided in the vehicle passenger compartment 7 in a well-known manner in a location adjacent to the dashboard means 54. However, it is to be noted that the actuator control means 47 with the shiftable button 51 can be located on the dashboard in a central location or optionally such a control actuator and button means can be provided adjacent to each of opposite ends of the dashboard means 54 to permit individual control by passengers seated on the left and right-hand portions of the seat S within the vehicle passenger compartment 7. Such individual control can be provided for visor means located on either side of a roof-attached bracket 58 for a centrally located rear view mirror 59.

One sun-glare visor means or panel, generally indicated by numeral 60, is shown in FIGURE 1 in alternate positions achieved by journaling one edge of the visor means or panel 60 about an axis or pivot 61. A segmented gear member 62 having a plurality of teeth 63 thereon can engage a rack portion 64 having teeth 65 carried by a rod portion 66 of a piston means 67 reciprocable within an actuator or cylinder body portion 68 which can be suitably secured to the roof portion 9 of the vehicle body 6. The fluid presure movable piston 67 is indicated in phantom in a position corresponding to a retracted positioning also indicated in phantom for the sun visor means or panel 60 in FIGURE 1.

In FIGURES 2 and 3 there can be seen a modification of the features of a fluid-actuated visor system adapted for use with a rear window or transparent portion 69 of vehicle 6. A visor means, generally indicated by numeral 70, can have a contoured configuration substantially parallel to the vehicle roof 9 and terminating in substantially opposite though parallel edges 71. These edges 71 slidably engage a groove portion or track means 72 extending longitudinally within an upper portion of the interior or passenger compartment of the vehicle in a location substantially parallel to the roof portion 9 of the vehicle 6. The groove portion or track means 72 can be suitably attached to the vehicle body or roof portion 9 which also supports an actuator or cylindrical housing 73 in which a piston 74 is reciprocally movable to transmit to and fro sliding movement by way of a rod 75 carried by the piston 74 and joined by an articulated linkage 76 to an upper end of the visor means or panel 70. The modification of FIGURE 2 further provides a mounting of the actuator control means now indicated by reference numeral 77 directly on one side of the steering post 57 for the steering wheel 56 of the vehicle 6. A pair of conduit connections 78 and 79 corresponding to connections 48 and 49 respectively in FIGURE 1, can be provided between the valve control means 77 and actuator 73. The control means 77 can have a structural configuration similar to that noted earlier. It is to be understood that in place of a steering post mounting for the control valve means 77, it is also possible to provide such a conutrol adjacent to a rear seat in the passage compartment of the vehicle so that a shielding against the entry of sunlight through the rear window 69 can also be brought about by a passener in the rear of the vehicle. It is to be noted that the length of the visor means or shielding panel 70 of suitable plastic or insulating material can be provided in accordance with size of the rear window 69 and rearward slope of the roof portion 9. Similarly, the length of the rod portion 75 and articulated linkage 76 can be provided to permit reciprocable to and fro movement of the parts free of any binding engagement and/or interference with the underside of the roof portion 9.

In FIGURES 4 and 5 still a further embodiment of the present invention can be see as installed on vehicle 6 having the windshield 8 and roof portion 9 as well as steering wheel 56. Again there is shown a bracket 58 supporting a mirror 59 adjustable to differing positions for rear viewing at differing levels according to choice of a driver. In the arrangement of FIGURES 4 and 5 there can be provided a roll-up tongue-like visor means, generally indicated by numeral 80, including plural bag-like compartments 81 joined to each other along seams or junctures 82 such that each of the compartments is inflatable and deflatable individually by way of manifold means 84 which can be mounted on either side of the bracket 58 and mirror 59. Pressurized fluid can be supplied through inlet conduit means 85 for the manifold means 84 and individual passages or apertures 86 can be provided inside the manifold means for communicating with the space inside each of the compartments or bag-like portions 81 of the visor means 80. A conduit connection 88 can be joined to a source of fluid pressure such as 18 by way of a control valve means which can alternately permit supply and exhaust of pressurized fluid such as compressed air relative to the space within the compartments or bag-like portions 81. Thickness of the compartments can be controlled by width or lateral distance between the seams or junctures 82 substantially parallel to each other. Length of inflatable bag-like portions adjacent to the mirror means 59 can be shortened so as to enhance rear viewing vision by way of the mirror means 59 for the first or second bag-like portion immediately adjacent to the mirror means on either side thereof. When pressurized fluid such as compressed air is exhausted from the compartment or bag-like portions 81 there is a spirally retracted positioning indicated by reference numeral 90 in FIGURE 4 such that the visor means is curled upwardly into a location immediately adjacent to an underside of the roof portion 9 and rearwardly from upper edging of the windshield 8. It is to be noted that passenger control for the visor means 80 can be arranged for right and left actuation by provision of a separate pressure conduit connection in place of the centralized conduit 88. Also it is to be noted that the inflatable and deflatable visor means can be readily provided for operation along an inner side of side as well as rear windows of a vehicle. The spirally retractable visor means 80 can be readily located within the upper confines of the passenger compartment 7 and even opening and closing of doors with movable windows thereon would not interfere with the spirally resilient positioning of the visor means 80 possible in accordance with the present invention.

It is to be understood that a liquid fluid source could also be used in a closed conduit type arrangement for retention of such liquod fluid which can be pressurized by a pump in combination with the features disclosed. However, the pneumatic or pressurized air source is preferred since any leakage in conduit connections would not result in loss of fluid which could mar or discolor interior decorations and appointments of the vehicle.

The fluid-actuated visor systems disclosed herein permit remote control of visor positioning by a vehicle driver or operator as well as by passengers who can remain comfortably seated and need not stretch their arms excessively in an attempt to reach a previously manually operated visor and the like. Also, it is to be noted that the actuator control means when positioned on a dashboard means, steering post or along interior surfacing of the passenger compartment can be readily seen and reached particularly since the glary sunlight does not obstruct view of such actuator control means within ready access thereto. On manually operated visor arrangements, it is generally necessary to stretch and reach in the direction of the visor coinciding with the direction of the blinding bright light thus making it more difficult to find and move the manually operable visor. The actuator control means on the dashboard, steering post and compartment surfacing clearly will be located below eyelevel and below the direction of entry of bright and glary illumination.

It is to be understood also that the inflatable and deflatable visor means 80 of FIGURES 4 and 5 has an additional advantage in that a resiliently deflectable pneumatic padding is provided in effect whenever the visor means 80 is in an inflatted and extended position relative to the windshield or other glass area. Thus the visor means in effect provides a soft and resiliently deflectable padding as a crash pad protection particularly for a head of a passenger. This resiliently deflectable bellows-like pneumatically pressurized visor means 80 can thus serve a dual purpose of crash pad protection as well as inflatable and deflatable glare protection for the eyes and visionary purposes. The eyes are further protected by such pneumatically protectable padded visor means which can shield the head portion and eyes against possible splintering of glass if the latter is struck by objects from the outside due to collision or flying debris.

It is to be noted that the actuator control means can be modified also to have three or more conduit connections thereto for permitting selective positioning of the visor means into predetermined locations angular as to the roof portion 9 and windshield 8, for example. In the embodiment of FIGURE 1, it would thus be possible to position the visor means 60 vertically as well as substantially parallel to the windshield means and such a vertical positioning could be accomplished by an intermediate conduit connection. Similarly, intermediate positioning could be accomplished in the embodiment of FIGURE 2 and it is quite apparent in the embodiment of FIGURE 4 and FIGURE 5 that an infinitely variable number of positions can be obtained inaccordance with the spiral unwrapping of the visor means 80 dependent upon the length of time or amount of pressurized air admitted thereto by way of the conduit connections and manifold means therewith.

While the embodiments of the present invention as herein disclosed constitute preferred forms, it is to be understood that other forms might be adopted.

What is claimed is as follows:

1. In combination on a vehicle, a pressurized fluid source, a passenger-accessible multi-position control means mounted within reach in a passenger compartment and having conduit means therewith to control supply and relief of pressurized fluid by way of a manifold means, and a compartmented tongue-like visor means having a spiral-bag configuration structurally secured to said manifold means so as to be inflatable and deflatable in spiral roll movement as a glare shield on one side of a transparent window of the vehicle.

2. In combination on a vehicle, a pressurized fluid source, a passenger-accessible multi-position control means mounted within reach in a passenger compartment and having conduit means therewith to control supply and relief of pressurized fluid by way of a manifold means, a compartmented tongue-like visor means having a spiral-bag configuration structural secured to said manifold means so as to be inflatable and deflatable in spiral roll movement as a glare shield on one side of a transparent window of the vehicle, said visor means including plural bag-like compartmenting in fluid communication with said conduit means through corresponding openings of said manifold means.

3. In combination on a vehicle, a pressurized fluid source, a passenger-accessible multi-position control means mounted within reach in a passenger compartment and having conduit means therewith to control supply and relief of pressurized fluid by way of a manifold means, and a compartmented tongue-like visor means having a spiral-bag configuration structurally secured to said manifold means so as to be inflatable and deflatable in spiral roll movement as a glare shield on one side of a transparent window of the vehicle, said visor means including parallel joint compartments collectively inflatable and deflatable through said manifold means subject to spiral compacting and unwrapping thereof into predetermined positioning.

4. On a motorized vehicle including glass area for vision as well as unsprung mass and a sprung mass between which predetermined clearance height is maintained by supply of pressurized gaseous medium from a high pressure storage tank means to a bellows-type air spring means located between sprung and unsprung masses, the improvement therewith which comprises a manifold means mounted adjacent to vehicle glass area, a passenger-accessible multi-position control means mounted within reach in a passenger compartment and having conduit means therewith for interconnection of said tank means and said manifold means, and a compartmented tongue-like visor means having a spiral-bag configuration structurally secured to said manifold means so as to be inflatable and deflatable in spiral roll movement in response to control means actuation both as a glare shield for vision protection and as a crash pad for head protection as to vehicle glass area.

5. In a motorized vehicle having predetermined glass area and having a source of pressurized fluid medium in a combined suspension height and visor control system, the improvement therewith which comprises a manifold means mounted adjacent to vehicle glass area, a passenger-accessible multi-position control means mounted within reach in a passenger compartment and having conduit means therewith for interconnection of the source and said manifold means, and tongue-like visor means having a spiral-bag configuration structural secured to said manifold means so as to be inflatable and deflatable in spiral roll movement, said visor means including plural bag-like compartmenting in fluid communication with said conduit means through corresponding openings of said manifold means.

6. In a motorized vehicle having predetermined glass area and a source of pressurized fluid medium in a combined suspension height and visor control system, the improvement therewith which comprises a manifold means mounted adjacent to vehicle glass area, a passenger-accessible control means that valves interconnection of the source and said manifold means, and tongue-like visor means having a spiral-bag configuration structurally secured to said manifold means so as to be inflatable and deflatable in spiral roll movement, said visor means including plural bag-like compartmenting substantially parallel in junction and simultaneously collectively in communication with said manifold means in response to control means actuation both as a glare shield for vision protection and as a crash pad for head protection as to vehicle glass area.

7. On a motorized vehicle including an unsprung mass and a sprung mass between which predetermined clearance height is maintained, a motor driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises, a further valve control means located to be accessible within a passenger compartment of the vehicle and having conduit connection to said same high pressure storage tank means, and a fluid-actuated visor means carried along one side of an upper edging of a vehicle windshield means as well as having fluid conduit interconnection to said further valve control means to effect movement of said fluid actuated visor means into various positioning in a range between retraction as well as selectively into glare-shielding location as to a particular vehicle direction, said fluid-actuated visor means structurally including a segmental gear means in engagement with a rack portion of a rod of a reciprocable piston in a fluid actuator that effects pivotal movement of said visor means between retraction and glare-shielding locations.

8. On a motorized vehicle including an unsprung mass and a sprung mass between which predetermined clearance height is maintained, a motor driven compressor means, a single high pressure storage tank means supplied with pressurized gaseous medium, a bellows-type air spring means located between sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid-actuated visor means carried along one side of an upper edging of a vehicle windshield means as well as having fluid conduit interconnection to said further valve control means to effect movement of said fluid actuated visor means into various positioning in a range between retraction as well as selectively into glare shielding location as to a particular vehicle direction, said fluid-actuated visor means including a manifold means having fluid conduit interconnection to said further valve control means and carrying a roll-up tongue-like bag means with predetermined thickness for both glare shielding and crash pad protection of an occupant's head in the vehicle at least during glare shielding location of said bag means.

9. On a motorized vehicle including an unsprung mass and a sprung mass between which predetermined clearance height is maintained, a motor-driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid-actuated visor means carried along one side of an upper edging of a vehicle windshield means as well as having fluid conduit interconnection to said further valve control means to effect movement of said fluid actuated visor means into various positioning in a range between retraction as well as selectively into glare-shielding location as to a particular vehicle direction, said fluid-actuated visor means including a manifold means adjacent to a vehicle windshield means and corresponding joined bag-like compartments collectively forming said visor means at left and right locations and each inflatable into plural internal positioning and spirally retractable into a compacted location adjacent to vehicle window means.

10. On a motorized vehicle including an unsprung mass and a sprung mass between which predetermined clearance height is maintained, a motor-driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid actuated visor means carried along one side of an upper edging of a vehicle windshield means as well as having fluid conduit interconnection to said further valve control means to effect movement of said fluid-actuated visor means into various positioning in a range between retraction as well as selectively into glare-shielding location as to a particular vehicle direction, said further valve control means being mounted on one side of a steering post within a passenger compartment of the vehicle and out of line of entry of bright-light glare.

11. On a motorized vehicle including an unsprung mass and a sprung mass between which predetermined clearance height is maintained, a motor driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid-actuated visor means carried along one side of an upper edging of a vehicle windshield means as well as having fluid conduit interconnection to said further valve control means to effect movement of said fluid actuated visor means into various positioning in a range between retraction as well as selectively into glare shielding location as to a particular vehicle direction, said fluid-actuated visor means structurally including a segmental gear means in engagement with a rack portion of a rod of a reciprocable piston in a fluid actuator that effects pivotal movement of said visor means between retraction and glare shielding locations, said further valve control means being mounted on one side of a steering post within a passenger compartment of a vehicle and out of line of entry of bright light glare.

12. On a motorized vehicle including a unsprung mass and a sprung mass between which predetermined clearance height is maintained, a motor driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid-actuated visor means carried along one side of an upper edging of a vehicle windshield means as well as having fluid conduit interconnection to said further valve control means to effect movement of said fluid actuated visor means into various positioning in a range between retraction as well as selectively into glare-shielding location as to a particular vehicle direction, said further valve control means being carried by a dashboard means within a passenger compartment of the vehicle and out of line of entry of bright-light glare, said fluid-actuated visor means including a manifold means having fluid conduit interconenction to said further valve control means and carrying a roll-up tongue-like bag means with predetermined thickness for both glare shielding and crash pad protection of an occupant's head in the vehicle at least during glare shielding location of said bag means.

13. On a motorized vehicle including an unsprung mass and a sprung mass between which predetermined clearance height is maintained, a motor driven compressor means, a single high pressure storage tank means supplied with pressurized gaseous medium, a bellows-type air spring means located between said sprung and unsprung masses, height control valve means operable to control supply and exhaust of said pressurized gaseous medium to and from said air spring means, the improvement which comprises a further valve control means located to be accessible within a passenger compartment of the vehicle and having conduit connection to said same high pressure storage tank means, and a fluid actuated visor means carried along one side of an upper edging of a vehicle windshield means as well as having fluid conduit interconnection to said further valve control means to effect movement of said fluid actuated visor means into various positioning in a range between retraction as well as selectively into glare-shielding location as to a particular vehicle direction, said further valve control means being carried by a dashboard means within a passenger compartment of the vehicle out of line of entry of bright-light glare, said fluid-actuated visor means including a manifold means adjacent to a vehicle windshield means and corresponding joined bag-like compartments having thickness controlled by width and lateral distance between junctural seams substantially parallel to each other collectively forming said visor means at left and right locations and each inflatable into plural internal positioning and spirally retractable into a compacted location adjacent to said manifold means and said vehicle window means.

14. Structure on a vehicle, comprising, a single source of pressurized fluid used to actuate both a vehicle ride-height suspension system for support and shock absorption between sprung and unsprung masses and a fluid actuated sun visor system having a vehicle body supported fluid actuator for variable movement of a visor means between retraction and glare-shielding locations along inner sides of transparent viewing locations where passengers are subjected to bothersome glare and bright light, and a manually controlled valve means for supplying and exhausting fluid from said fluid actuator.

15. Structure on a vehicle, comprising, a single source of pressurized fluid used to actuate both a vehicle ride-height suspension system for support and shock absorption between sprung and unsprung masses and a fluid actuated sunvisor system having a vehicle body supported fluid actuator for variable movement of a visor means between retraction and glare-shielding locations along inner sides of transparent viewing locations where passengers are subjected to bothersome glare and bright light, manually controlled valve means connected between the single fluid source and said sun visor fluid actuator for supplying and exhausting fluid from the fluid actuator, track like support means extending along corresponding laterally separated and substantially parallel opposite roof portion edges, a one-piece visor means body portion having opposite edging thereof slidable between retraction and glare shielding locations along said track-like support means, and an articulated linkage centrally joining said fluid actuator and visor means body portion.

16. Structure on a vehicle, comprising, a single source of pressurized fluid used to actuate both a vehicle ride-height suspension system for support and shock absorption between sprung and unsprung masses and a fluid actuated sunvisor system having a vehicle body supported fluid actuator for variable movement of a visor means between retraction and glare shielding locations along inner sides of transparent viewing locations where passengers are subjected to bothersome glare and bright light, manually controlled valve means connected between the single fluid source and said sun visor fluid actuator for supplying and exhausting fluid from said fluid actuator, and corresponding laterally separated opposite and substantially parallel rail-like tracks provided along an underside of a vehicle roof portion toward a rear window thereof, and said visor means including a one-piece body portion of insulating material having opposite edges that are slidable into variable positions of glare-shielding locations and retraction along said tracks in response to fluid actuation thereof.

17. Structure on a vehicle, comprising, a single source of pressurized fluid used to actuate both a vehicle ride-height suspension system for support and shock absorption between sprung and unsprung masses and a fluid actuated sunvisor system having a vehicle body supported fluid actuator for variable movement of a visor means between retraction and glare shielding locations along inner sides of transparent viewing locations where passengers are subjected to bothersome glare and bright light, manually controlled valve means connected between the single fluid source and said sun visor fluid actuator for supplying and exhausting fluid from said fluid actuator, a mirror being bracket supported to extend downwardly from a roof portion in a substantially central windshield location within the vehicle, and said fluid actuated portions of the visor means being located internally on either side to left and right of the mirror.

18. Structure on a vehicle, comprising, a single source of pressurized fluid used to actuate both a vehicle ride-height suspension system for support and shock absorption between sprung and unsprung masses and a fluid actuated sunvisor system having a vehicle body supported fluid actuator for variable movement of a visor means between retraction and glare-shielding locations along inner sides of transparent viewing locations where passengers are subjected to bothersome glare and bright light, manually controlled valve means connected between the single fluid source and said sun visor fluid actuator for supplying and exhausting fluid from said fluid actuator, said visor means including an inflatable body portion with dual purpose as a crash pad for head protection as to glass and as a glare shield for vision protection.

19. Structure on a vehicle, comprising, a single source of pressurized fluid used to actuate both a vehicle ride-height suspension system for support and shock absorption between sprung and unsprung masses and a fluid actuated sunvisor system having a vehicle body supported fluid actuator for variable movement of a visor means between retraction and glare shielding locations along inner sides of transparent viewing locations where passengers are subjected to bothersome glare and bright light, manually controlled valve means connected between the single fluid source and said sun visor fluid actuator for supplying and exhausting fluid from said fluid actuator, and a rear vision mirror means, said visor means including a pair of spaced apart spirally inflatable and deflatable compartmentalized portions extending laterally in opposite directions away from said mirror means providing glare shields as well as crash pad protection against splinters from said mirror means and windshield glass.

References Cited by the Examiner
UNITED STATES PATENTS

| | | | |
|---|---|---|---|
| 1,652,682 | 12/1927 | Phillips | 296—97 |
| 1,854,892 | 4/1932 | Ewend | 296—97 |
| 1,963,091 | 6/1934 | Jenkins | 180—66 |
| 2,122,120 | 6/1938 | Thode | 296—97 |
| 2,158,330 | 5/1939 | Larson | 296—97 |
| 2,607,906 | 8/1952 | Sang | 296—97 |
| 2,829,003 | 4/1958 | Noyes | 296—97 |
| 2,834,609 | 5/1958 | Bertrand | 296—84 |
| 2,862,762 | 12/1958 | McCormick | 296—97 |
| 2,921,528 | 1/1960 | Muller. | |
| 3,151,663 | 10/1964 | Bohner et al. | 180—64 |

BENJAMIN HERSH, *Primary Examiner.*

A. HARRY LEVY, *Examiner.*